United States Patent
Boswell

(10) Patent No.: US 10,604,632 B2
(45) Date of Patent: Mar. 31, 2020

(54) WATER-SOLUBLE FILMS

(71) Applicant: The Procter & Gamble Company, Cincinnati, OH (US)

(72) Inventor: Emily Charlotte Boswell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 17 days.

(21) Appl. No.: 15/942,902

(22) Filed: Apr. 2, 2018

(65) Prior Publication Data

US 2018/0291162 A1    Oct. 11, 2018

Related U.S. Application Data

(60) Provisional application No. 62/482,999, filed on Apr. 7, 2017, provisional application No. 62/483,024, filed on Apr. 7, 2017, provisional application No. 62/483,033, filed on Apr. 7, 2017, provisional application No. 62/483,013, filed on Apr. 7, 2017.

(51) Int. Cl.

| | |
|---|---|
| *C08J 5/18* | (2006.01) |
| *C11D 17/04* | (2006.01) |
| *B32B 27/22* | (2006.01) |
| *B32B 27/08* | (2006.01) |
| *B32B 27/30* | (2006.01) |

(52) U.S. Cl.
CPC ............. *C08J 5/18* (2013.01); *B32B 27/08* (2013.01); *B32B 27/22* (2013.01); *B32B 27/306* (2013.01); *C11D 17/042* (2013.01); *B32B 2250/246* (2013.01); *B32B 2307/7166* (2013.01); *B32B 2307/7242* (2013.01); *B32B 2307/7244* (2013.01); *B32B 2307/7246* (2013.01); *C08J 2300/14* (2013.01); *C08J 2329/02* (2013.01); *C08J 2329/04* (2013.01); *C08J 2331/04* (2013.01)

(58) Field of Classification Search
None
See application file for complete search history.

(56) References Cited

U.S. PATENT DOCUMENTS

| | | | |
|---|---|---|---|
| 5,763,033 A | 6/1998 | Tropsha et al. | |
| 7,138,452 B2 | 11/2006 | Kim et al. | |
| 7,691,485 B2 | 4/2010 | Moriyama et al. | |
| 7,781,506 B2 * | 8/2010 | Urian | C08F 8/14 524/308 |

(Continued)

FOREIGN PATENT DOCUMENTS

| | | |
|---|---|---|
| JP | 2004285143 | 10/2004 |
| JP | 2006312313 | 11/2006 |

(Continued)

OTHER PUBLICATIONS

U.S. Appl. No. 16/015,252, filed Jun. 22, 2018, Boswell et al.

(Continued)

*Primary Examiner* — David Sample
*Assistant Examiner* — Nicole T Gugliotta
(74) *Attorney, Agent, or Firm* — Daniel S. Albrecht

(57) ABSTRACT

Water-soluble films made from copolymers of butene-diol and vinyl alcohol, wherein the films have improved barrier properties (such as low transmission rates for oxygen and water vapor) as well as good solubility.

20 Claims, 6 Drawing Sheets

(56) References Cited

U.S. PATENT DOCUMENTS

| | | |
|---|---|---|
| 7,928,166 B2 | 4/2011 | Shibutani |
| 8,026,302 B2 | 9/2011 | Shibutani et al. |
| 9,593,254 B2 | 3/2017 | Inoue et al. |
| 9,657,388 B2 | 5/2017 | Ebata et al. |
| 2003/0232083 A1* | 12/2003 | Wynn ................ A23G 1/54 424/473 |
| 2005/0226826 A1* | 10/2005 | Eason ............ C11D 17/042 424/60 |
| 2007/0178299 A1 | 8/2007 | Verrall |
| 2008/0146481 A1 | 6/2008 | Brown et al. |
| 2009/0142227 A1 | 6/2009 | Fuchs et al. |
| 2009/0250370 A1 | 10/2009 | Whitchurch |
| 2011/0281167 A1 | 11/2011 | Sabi et al. |
| 2013/0034667 A1 | 2/2013 | Hunt et al. |
| 2015/0118544 A1 | 4/2015 | Oukassi |
| 2015/0267155 A1* | 9/2015 | Brooker ............ C11D 17/045 8/137 |
| 2015/0368384 A1 | 12/2015 | Shibutani et al. |
| 2016/0186309 A1 | 6/2016 | Henderson |
| 2017/0130061 A1 | 5/2017 | Baker et al. |
| 2017/0239686 A1 | 8/2017 | Jahromi |
| 2017/0259961 A1 | 9/2017 | O'Donnell et al. |
| 2017/0259971 A1 | 9/2017 | O'Donnell et al. |
| 2017/0259972 A1 | 9/2017 | O'Donnell et al. |
| 2018/0290440 A1 | 10/2018 | Boswell |
| 2018/0291162 A1 | 10/2018 | Boswell |

FOREIGN PATENT DOCUMENTS

| | | |
|---|---|---|
| JP | 2016020085 | 2/2016 |
| JP | 2016121204 | 7/2016 |
| WO | WO2016132859 A1 | 8/2016 |

OTHER PUBLICATIONS

U.S. Appl. No. 16/015,270, filed Jun. 22, 2018, Boswell et al.
Search Report and Written Opinion for PCT/US2018/025642 dated Jul. 9, 2018.
All Office Actions for U.S. Appl. No. 15/942,865.
All Office Actions for U.S. Appl. No. 16/015,252.
All Office Actions for U.S. Appl. No. 16/015,270.
U.S. Appl. No. 15/942,865, filed Apr. 2, 2018, Boswell.
Nichigo G-Polymer Application Examples. (n.d.). Retrieved Mar. 29, 2018, from http://www.g-polymer.com/eng/youtorei1/.
Nichigo G-Polymer product development concept. (n.d.). Retrieved Mar. 29, 2018, from http://www.g-polymer.com/eng/kaihatukonseputo/.
Nichigo G-Polymer. (n.d.). Retrieved Mar. 29, 2018, from http://www.g-polymer.com/eng/.
Overview of G-Polymer Products. (n.d.). Retrieved Mar. 29, 2018, from http://www.g-polymer.com/eng/syouai/.
Overview of G-Polymer types. (n.d.). Retrieved Mar. 29, 2018, from http://www.g-polymer.com/eng/grades/.

* cited by examiner

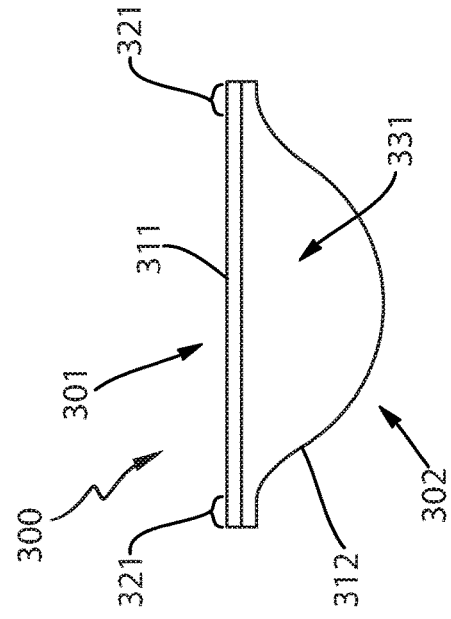
FIG. 3A
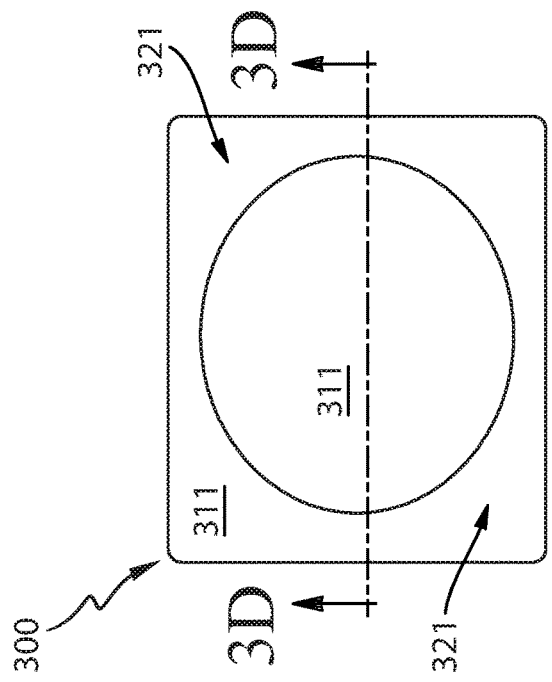
FIG. 3B
FIG. 3C
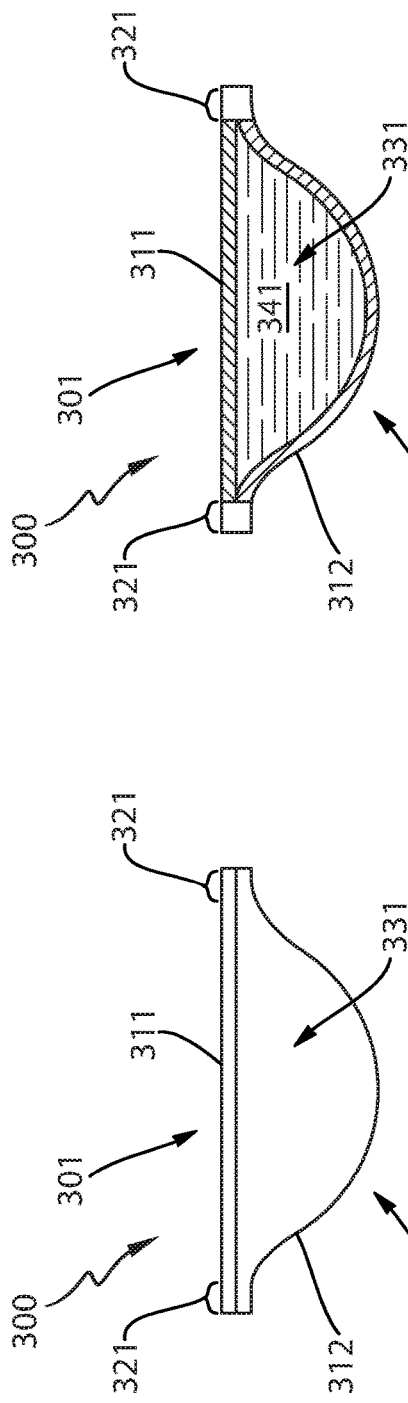
FIG. 3D
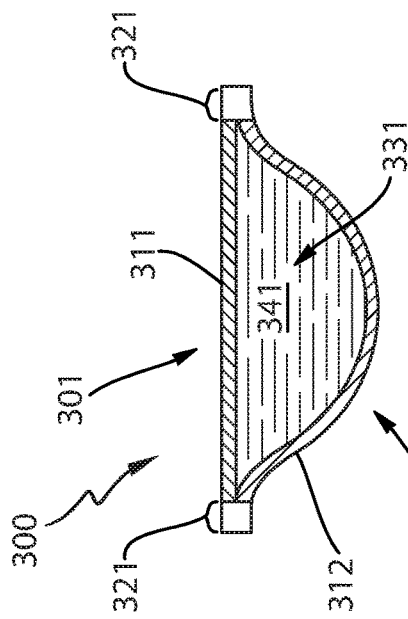

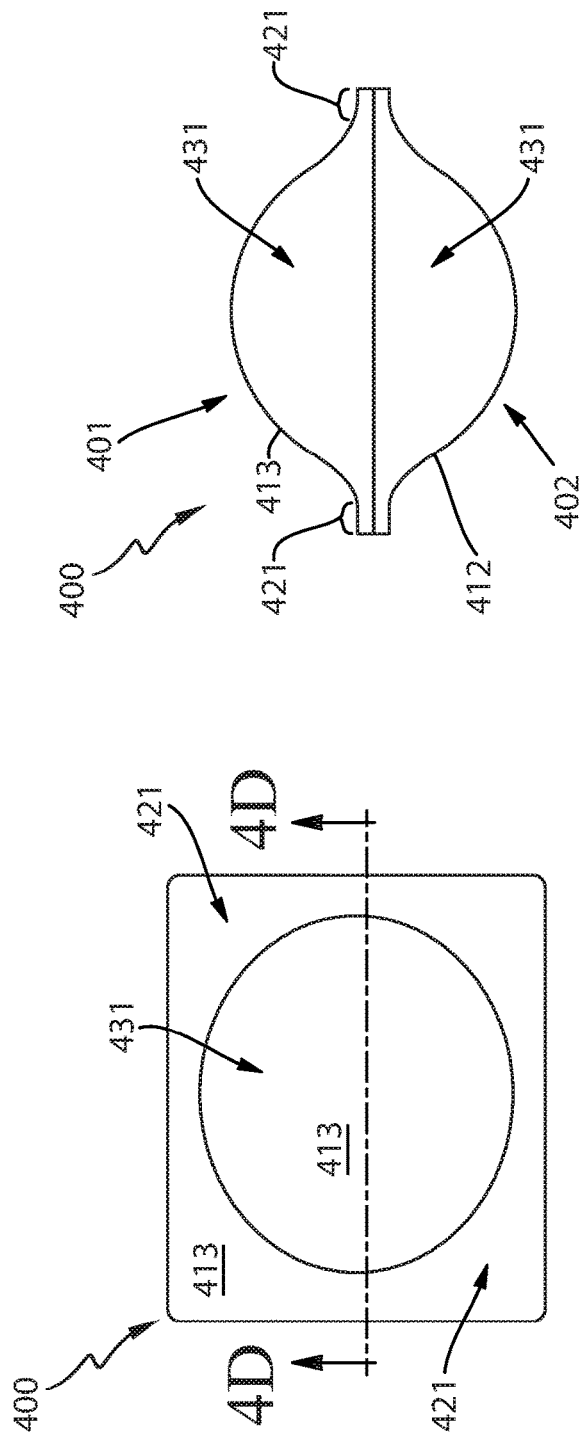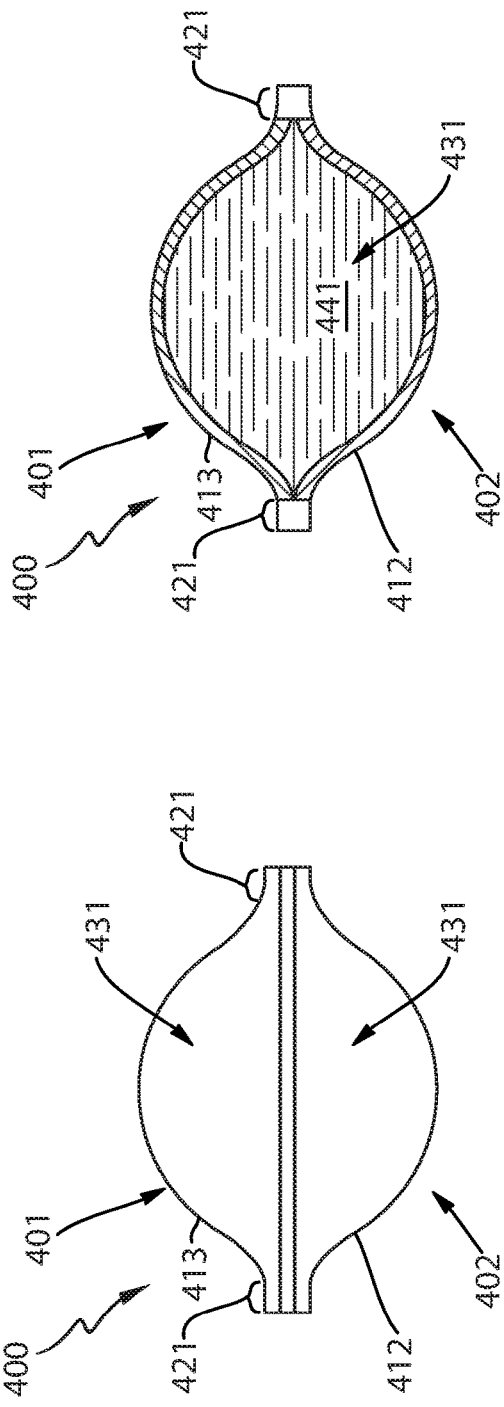

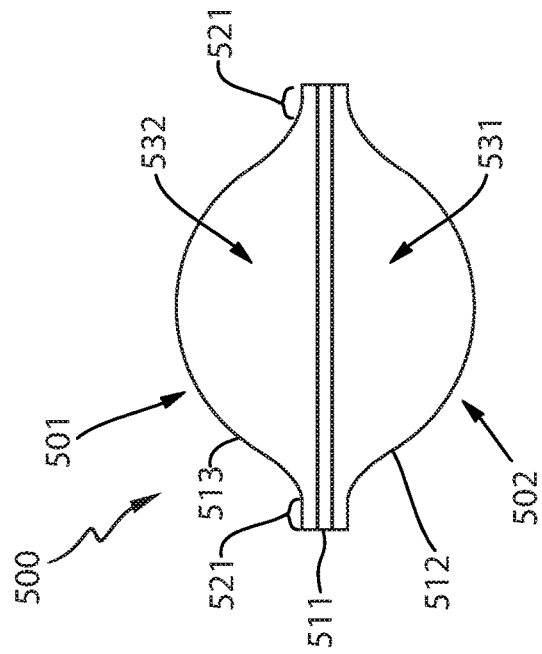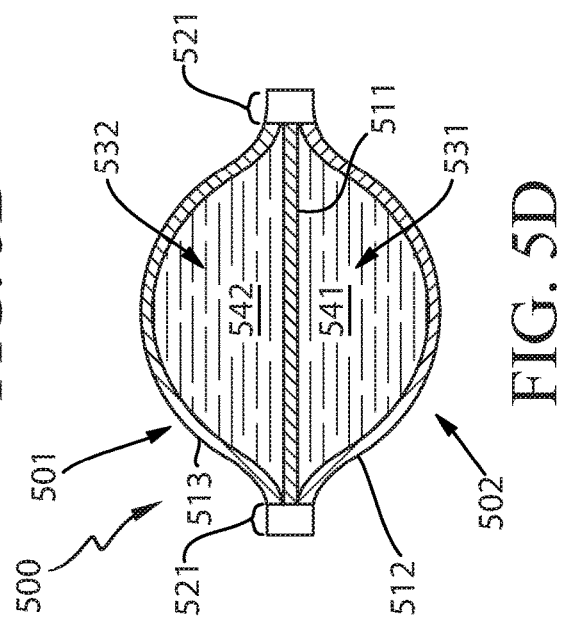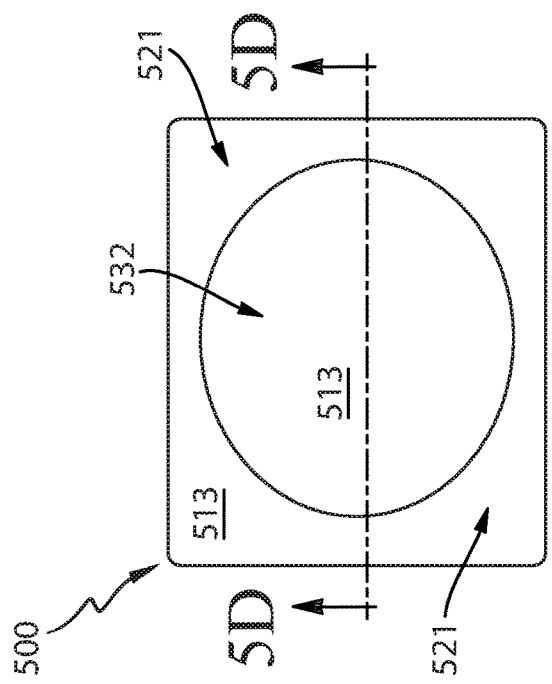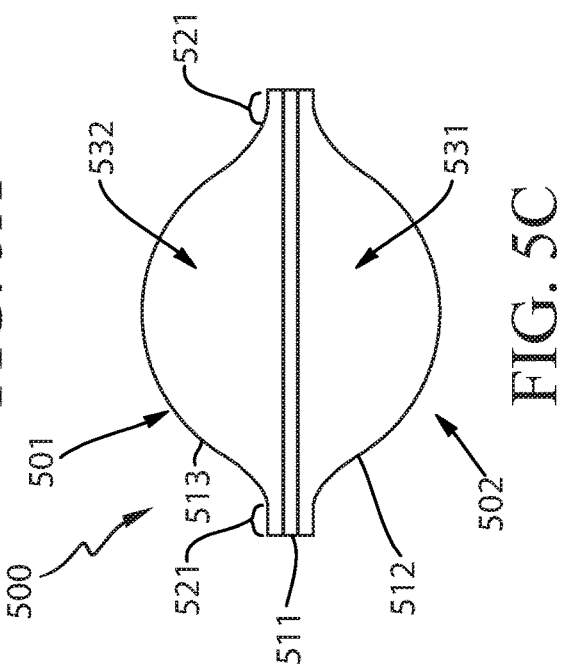

WATER-SOLUBLE FILMS

FIELD

The present disclosure relates in general to water-soluble films and in particular to water-soluble films with improved barrier properties.

BACKGROUND

Many water-soluble films have limited barrier properties. As a result, such films can allow various chemistries to migrate through, over time. When films allow oxygen (from the atmosphere) to migrate through, articles that use such films as barriers cannot include compositions that are prone to oxygen degradation. And, when films allow aqueous chemistries to migrate through, unit dose articles made from such films cannot include incompatible aqueous chemistries in adjacent compartments.

BRIEF DESCRIPTION OF THE DRAWINGS

FIG. 3A illustrates a top view of a unit dose article having a flat top, a rounded bottom, and a single compartment.

FIG. 3B illustrates a side view of the unit dose article of FIG. 3A.

FIG. 3C illustrates an end view of the unit dose article of FIG. 3A.

FIG. 3D illustrates a cross-sectional end view of the unit dose article of FIG. 3A.

FIG. 4A illustrates a top view of a unit dose article having a rounded top, a rounded bottom, and a compartment.

FIG. 4B illustrates a side view of the unit dose article of FIG. 4A.

FIG. 4C illustrates an end view of the unit dose article of FIG. 4A.

FIG. 4D illustrates a cross-sectional end view of the unit dose article of FIG. 4A.

FIG. 5A illustrates a top view of a unit dose article having a rounded top, a rounded bottom, and two overlapping compartments.

FIG. 5B illustrates a side view of the unit dose article of FIG. 5A.

FIG. 5C illustrates an end view of the unit dose article of FIG. 5A.

FIG. 5D illustrates a cross-sectional end view of the unit dose article of FIG. 5A.

DETAILED DESCRIPTION

Figure 1:
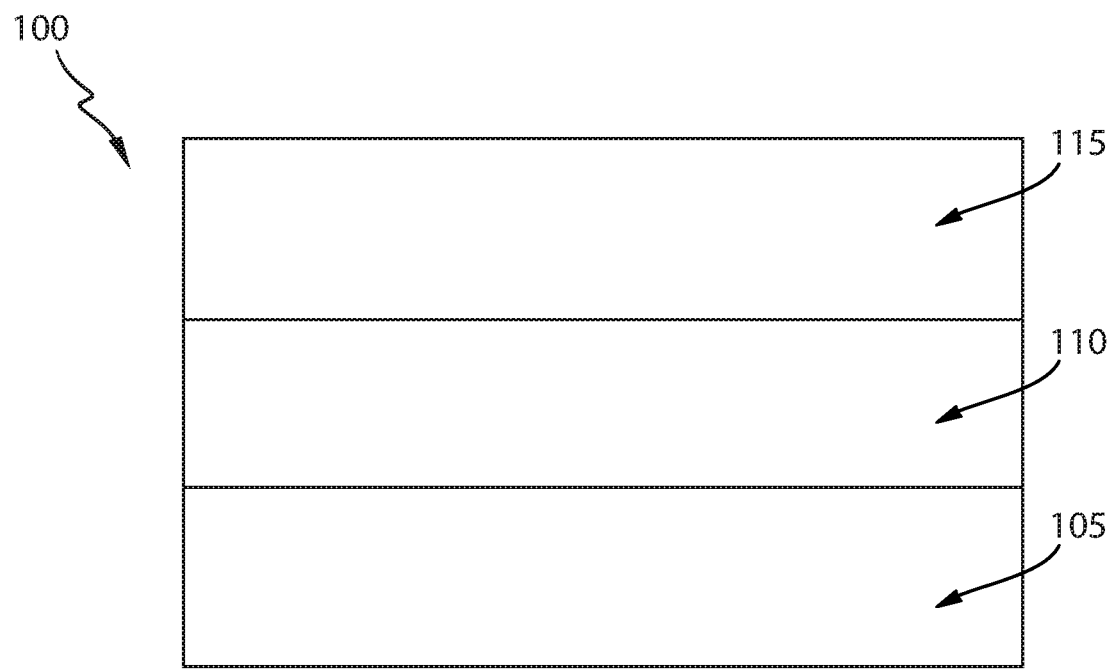
FIG. 1 illustrates a side view of a first exemplary embodiment of a multi-layer water-soluble film.

Water-soluble films of the present disclosure exhibit desirable chemical and physical properties including improved barrier properties (e.g. low transmission rates for oxygen and water vapor), good water solubility, and the ability to be extruded. These water-soluble films can be useful for the formation of water-soluble products and/or packaging, such as soluble unit dose articles. Generally, these water-soluble films can be formed from certain copolymers of butene-diol and vinyl alcohol ("BVOH").

Certain copolymers of BVOH having small crystallite size (e.g., amorphous copolymers) and a high degree of hydrolysis can be formed into water-soluble films which exhibit improved barrier properties as well as good water solubility. Without wishing to be bound by this theory, it is believed that water-soluble films formed from such BVOH copolymers may exhibit improved barrier properties due to the relatively large size of butene-diol monomer units, which apparently reduce crystallization in the copolymer (resulting in smaller crystallite sizes and lower degrees of crystallinity) while still allowing the polymer backbone to be both tightly packed and highly hydrolyzed. This seems to allow BVOH copolymers to exhibit improved barrier properties while maintaining good water solubility.

For the water-soluble films described herein, suitable BVOH copolymers can be produced by the copolymerization of vinyl acetate with butene diol followed by hydrolysis. Suitable butene diol monomers for the described BVOH copolymers can include 3,4-diol-1-butene, 3,4-diacyloxy-1-butenes, 3-acyloxy-4-ol-1-butenes, 4-acyloxy-3-ol-1-butenes, and the like. Additional details for other suitable BVOH monomers, copolymers, and methods of forming such copolymers are disclosed in U.S. Pat. No. 8,026,302, entitled "Polyvinyl alcohol resin composition and films," which is hereby incorporated by reference. BVOH copolymers can also be commercially obtained; examples include the 8070-grade and 8169-grade G-polymers manufactured by the Nippon Gohsei USA Co, Ltd. (La Porte, Tex., United States of America).

For any embodiment described herein of polymeric material comprising a BVOH copolymer, the polymeric material and/or the BVOH copolymer can be configured according to any of the crystallite sizes and any of the degrees of hydrolysis described herein (in any combination).

The polymeric material and/or the BVOH copolymer can be configured to have a crystallite size of 5-40 Angstroms, or any integer value for Angstroms between 5 and 40, or any range formed by any of these values, such as: 10-35 Angstroms, 10-30 Angstroms, 10-25 Angstroms, 10-20 Angstroms, 15-35 Angstroms, 15-30 Angstroms, 15-25 Angstroms, 15-20 Angstroms, etc. The polymeric material and/or the BVOH copolymer can be configured to have a degree of Hydrolysis of 70-100%, or any integer value for percentage between 70% and 100%, or any range formed by any of these values, such as 80-100%, 85-100%, 90-100%, 95-100%, 98-100%, 99-100%, 85-99%, 90-99%, 95-99%, 98-99%, 80-98%, 85-98%, 90-98%, 95-98%, 80-95%, 85-95%, 90-95%, etc. In embodiments wherein the hydrolysis is incomplete (i.e. polymers having a degree of hydrolysis less than 100%), the BVOH copolymer is a terpolymer comprising: vinyl alcohol monomer units, vinyl acetate monomer units; and butene diol monomer units. In embodiments where the hydrolysis is complete (i.e. having a degree of hydrolysis of 100%, also referred to as fully hydrolyzed), the BVOH copolymer can be considered a bipolymer comprising: vinyl alcohol monomer units and butene diol monomer units, but essentially no vinyl acetate monomer units (since essentially all of them have been converted into vinyl alcohol).

For any embodiment described herein of polymeric material comprising a BVOH copolymer, the polymeric material can also include any other additive or ingredient disclosed herein or known in the art of polymer science, in any workable combination.

The polymeric material can include 8-30%, by weight, of a plasticizer (including any kind of plasticizer known in the art, such as glycerin or polyethylene glycol, to improve flexibility and/or plasticity of a film made from the material), or any integer value for percentage (by weight) between 8% and 30%, or any range formed by any of these values, such as: 8-25%, 8-20%, 10-15%, etc.

The polymeric material can include 2.0-9.0%, by weight, of water (to reduce and/or prevent cracking in a film made from the material), or any percent weight of water by increments of half a percentage (by weight) between 2.0% and 9.0%, or any range formed by any of these values, such as: 2.5-8.5%, 3.0-8.0%, 3.5-7.5%, 4.0-7.0%, 4.5-6.5%, etc.

For any embodiment described herein of polymeric material comprising a BVOH copolymer, the polymeric material can have a weight average molecular weight (measured by gel permeation chromatography) of 50,000-95,000, or any weight average molecular weight by increments of 5,000 between 50,000 and 90,000, or any range formed by any of these values, such as: 55,000-95,000, 60,000-95,000, 65,000-95,000, 70,000-95,000, 75,000-95,000, 80,000-95,000, 85,000-95,000, etc.

Any embodiment of BVOH copolymer described herein can be used, by itself or as a component in any polymeric material described herein or known in the art, to form any water-soluble film described herein, and that film can be configured with any of the oxygen transmission rates, water vapor transmission rates, and/or solubility parameters (e.g. dissolution times) described herein (in any combination); the film can be processed and formed in any way described herein or known in the art of film-making (e.g. extrusion), in any workable combination.

For any embodiment described herein of water-soluble film made from a BVOH copolymer and/or a polymeric material comprising a BVOH copolymer, the film can also have an oxygen transmission rate of less than 400 $cm^3/(m^2 \cdot day)$, or any integer value for $cm^3/(m^2 \cdot day)$ that is less than 400, such as less than 370 $cm^3/(m^2 \cdot day)$, less than 345 $cm^3/(m^2 \cdot day)$, less than 320 $cm^3/(m^2 \cdot day)$, less than 295 $cm^3/(m^2 \cdot day)$, less than 265 $cm^3/(m^2 \cdot day)$, less than 225 $cm^3/(m^2 \cdot day)$, less than 190 $cm^3/(m^2 \cdot day)$, less than 155 $cm^3/(m^2 \cdot day)$, less than 120 $cm^3/(m^2 \cdot day)$, less than 90 $cm^3/(m^2 \cdot day)$, or any range formed by any of these values, in any combination.

For any embodiment described herein of water-soluble film made from a BVOH copolymer and/or a polymeric material comprising a BVOH copolymer, the film can also have a water transmission rate of less than 205 $g/(m^2 \cdot day)$, or any integer value for $g/(m^2 \cdot day)$ that is less than 205, such as less than 185 $g/(m^2 \cdot day)$, less than 165 $g/(m^2 \cdot day)$, less than 145 $g/(m^2 \cdot day)$, less than 130 $g/(m^2 \cdot day)$, less than 110 $g/(m^2 \cdot day)$, less than 95 $g/(m^2 \cdot day)$, less than 75 $g/(m^2 \cdot day)$, less than 55 $g/(m^2 \cdot day)$, or any range formed by any of these values, in any combination.

For any embodiment described herein of water-soluble film made from a BVOH copolymer and/or a polymeric material comprising a BVOH copolymer, the film can also have a dissolution time of less than 225 seconds, or any integer value for seconds that is less than 225, such as less than 205 seconds, less than 185 seconds, less than 165 seconds, less than 155 seconds, less than 145 seconds, less than 135 seconds, less than 125 seconds, less than 115 seconds, less than 105 seconds, less than 95 seconds, less than 85 seconds, or any range formed by any of these values, in any combination.

For any embodiment described herein of water-soluble film made from a BVOH copolymer and/or a polymeric material comprising a BVOH copolymer, the film can also have an overall thickness of 10-1000 micrometers, or any integer value in micrometers between 10 and 1000, or any range formed by any of these values, such as 15-500 micrometers, 20-300 micrometers, 25-200 micrometers, 35-150 micrometers, 50-100 micrometers, etc. In various embodiments, for a water-soluble film made of multiple layers, each of the individual layers can be configured with any convenient thickness such that the combined thickness for all of the layers adds up to any of these values for overall thickness; alternatively, a water soluble film can be made of a single layer, as known in the art.

FIG. 1 depicts a multi-layer film 100 formed of three layers. As illustrated by FIG. 1, the film 100 includes an inner layer 105, a middle layer 110, and an outer layer 115. In various embodiments, one, or two, or all three of the layers can include any embodiment of the BVOH copolymer (or a polymeric material comprising a BVOH copolymer), as described herein. In various embodiments, layers 105 and 115 can include a BVOH copolymer while the middle layer 110 can be formed of a different polymer such as a PVOH copolymer that is not copolymerized with butene diol. Although the layers 105, 110, and 115 are depicted in FIG. 1 as having about the same thickness, in various embodiments any of these layers can have a different thickness, including any thickness described herein. In various embodiments, a multi-layer film can include any number of layers, joined together in any convenient way, such as co-extrusion.

Figure 2:
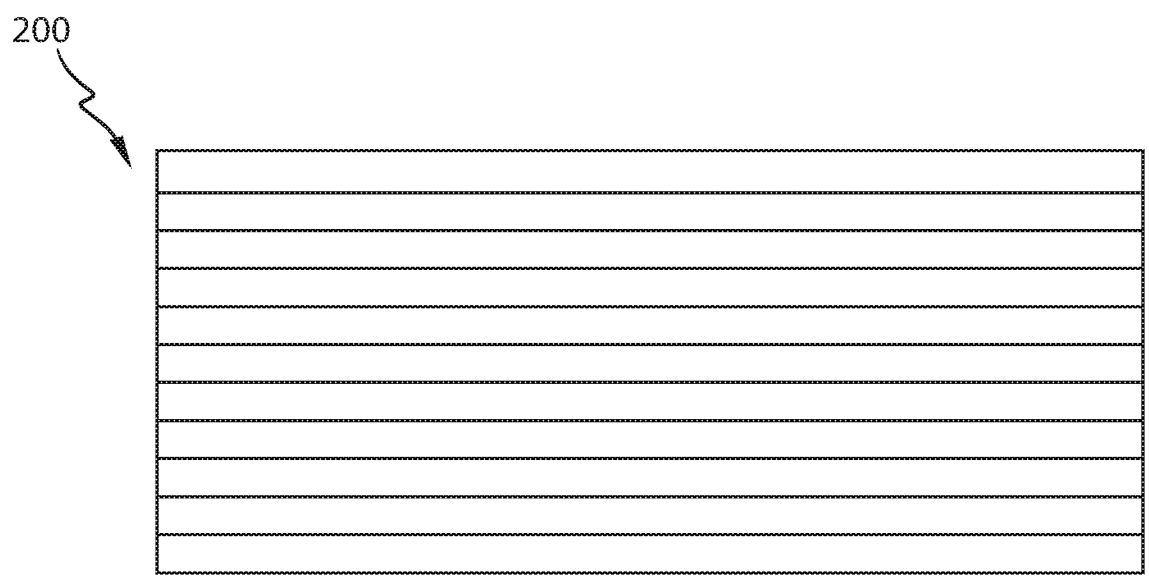
FIG. 2 illustrates a side view of a second exemplary embodiment of a multi-layer water-soluble film.

FIG. 2 illustrates a multi-layer film 200 formed by a microlayering system. A microlayering system can produce a multi-layer film that includes a large number of very thin layers. For example, a multi-layer film can include about 100 layers or more, about 500 layers or more, or even about 1000 layers or more in certain examples. The use of a microlayering system can affect the morphology of the layers and provide orientation to polymer chains and components dispersed in the polymer, as known in the art.

FIGS. 3A-7D illustrate various embodiments of exemplary soluble unit dose articles; in these figures, flexible materials are illustrated with exaggerated thicknesses in order to more clearly show their positions and relationships.

FIGS. 3A-3D illustrate various views of an exemplary soluble unit dose article 300 having a flat top 301, a rounded bottom 302, and one compartment 331. FIG. 3A is a top view, FIG. 3B is a side view, FIG. 3C is an end view, and FIG. 3D is a cross-sectional end view. In the top view, the overall shape of the article 300 is rectangular with rounded corners. The article 300 is formed by a first flexible material 311 that is sealed to a second flexible material 312 over a sealed area 321. The sealed area 321 forms a continuous connection between the flexible materials 311 and 312, all around the outer periphery of the article 300. Apart from the sealed area 321, the flexible materials 311 and 312 are independent from each other. The first flexible material 311 is disposed above the second flexible material 312, and is oriented about horizontally. On the bottom 302, in the middle of the article 300, the second flexible material 312 curves downward from the sealed area 321 and is offset from the first flexible material 311, such that the space between the flexible materials 311 and 312 forms the compartment 331, which has a side profile with an overall shape like an inverted bell. The compartment 331 surrounds and encloses a composition 341.

FIGS. 4A-4D illustrate various views of an exemplary soluble unit dose article 400 having a rounded top 401, a rounded bottom 402, and one compartment 431. FIG. 4A is a top view, FIG. 4B is a side view, FIG. 4C is an end view, and FIG. 4D is a cross-sectional end view. In the top view, the overall shape of the article 400 is rectangular with rounded corners. The article 400 is formed by a first flexible material 412 that is sealed to a second flexible material 413 over a sealed area 421. The sealed area 421 forms a continuous connection between the flexible materials 412 and 413, all around the outer periphery of the article 400. Apart from the sealed area 421, the flexible materials 411 and 412 are independent from each other. On the bottom 402, in the middle of the article 400, the first flexible material 412 curves downward from the sealed area 421, and on the top 401, in the middle of the article 400, the second flexible material 413 curves upward from the sealed area 421 such that the second flexible material 413 is offset from the first flexible material 412, and the space between the flexible materials 412 and 413 forms the compartment 431, which has a side profile with an overall shape like a pillow. The compartment 431 surrounds and encloses a composition 441.

FIGS. 5A-5D illustrate various views of an exemplary soluble unit dose article 500 having a rounded top 501, a rounded bottom 502, and two overlapping compartments 531 and 532. FIG. 5A is a top view, FIG. 5B is a side view, FIG. 5C is an end view, and FIG. 5D is a cross-sectional end view. In the top view, the overall shape of the article 500 is rectangular with rounded corners. The article 500 is formed by a first flexible material 511, a second flexible material 512, and a third flexible material 513, which are all sealed together over a sealed area 521. The sealed area 521 forms a continuous connection between the flexible materials 511, 512, and 513, all around the outer periphery of the article 500. Apart from the sealed area 521, the flexible materials 511, 512, and 513 are independent from each other. The first flexible material 511 is disposed between the second flexible material 512 and the third flexible material 513, and is oriented about horizontally. On the bottom 502, in the middle of the article 500, the second flexible material 512 curves downward from the sealed area 521 such that the second flexible material 512 is offset from the first flexible material 511, and the space between the flexible materials 511 and 512 forms the first compartment 531, which has a side profile with an overall shape like an inverted bell. The first compartment 531 surrounds and encloses a first composition 541. On the top 501, in the middle of the article 500, the third flexible material 513 curves upward from the sealed area 521 such that the third flexible material 513 is offset from the first flexible material 511, and the space between the flexible materials 512 and 513 forms the second compartment 532, which has a side profile with an overall shape like a bell. The second compartment 532 surrounds and encloses a second composition 542. The article 500 has a side profile with an overall shape like a pillow.

Figure 6A:
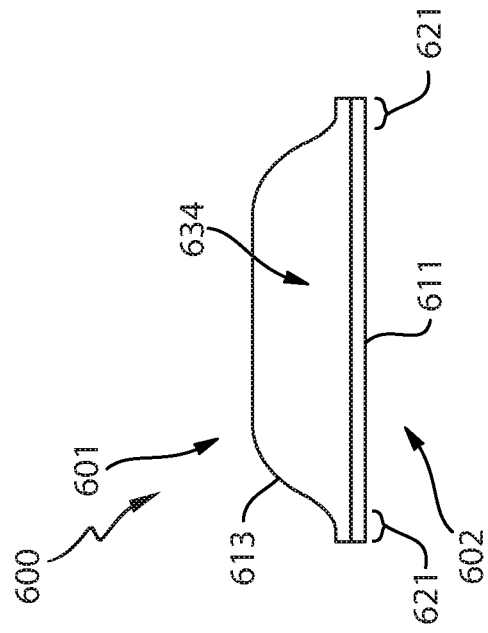
FIG. 6A illustrates a top view of a unit dose article having a rounded top, a flat bottom, and two side-by-side compartments.
Figure 6B:
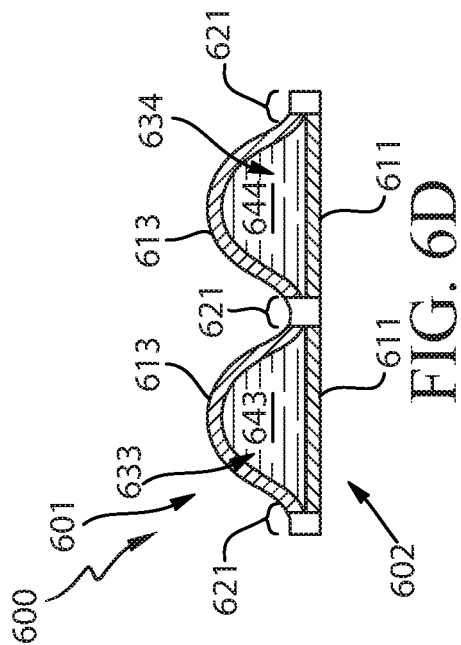
FIG. 6B illustrates a side view of the unit dose article of FIG. 6A.
Figure 6C:
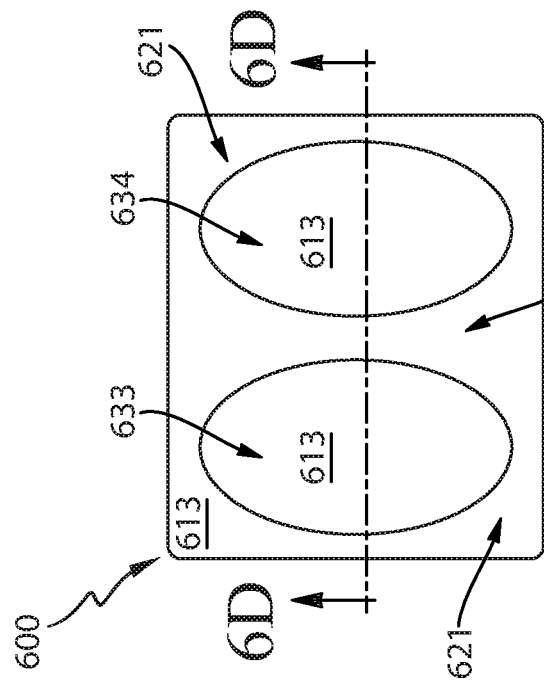
FIG. 6C illustrates an end view of the unit dose article of FIG. 6A.
Figure 6D:
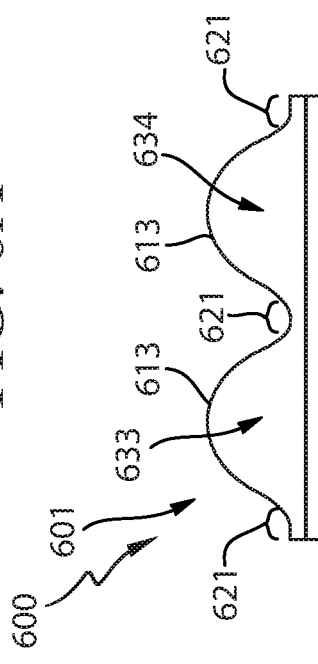
FIG. 6D illustrates a cross-sectional end view of the unit dose article of FIG. 6A.

FIGS. 6A-6D illustrate various views of an exemplary soluble unit dose article 600 having a rounded top 601, a flat bottom 602, and two side-by-side compartments 633 and 634. FIG. 6A is a top view, FIG. 6B is a side view, FIG. 6C is an end view, and FIG. 6D is a cross-sectional end view. In the top view, the overall shape of the article 600 is rectangular with rounded corners. The article 600 is formed by a first flexible material 611 that is sealed to a second flexible material 613 over a sealed area 621. The sealed area 621 forms a continuous connection between the flexible materials 611 and 613, all around the outer periphery of the article 600 and through a portion of the middle of the article 600. Apart from the sealed area 621, the flexible materials 611 and 613 are independent from each other. The first flexible material 611 is disposed below the second flexible material 613, and is oriented about horizontally. On the top 601, in a first part of the middle of the article 600, a first portion of the second flexible material 613 curves upward from the sealed area 621 such that that first portion of the second flexible material 613 is offset from the first flexible material 611, and the space between the flexible materials 611 and 613 forms the first compartment 633, which has a side profile with an overall shape like a rounded tube. The first compartment 633 surrounds and encloses a first composition 643. On the top 601, in a second part of the middle of the article 600, a second portion of the second flexible material 613 curves upward from the sealed area 621 such that that second portion of the second flexible material 613 is offset from the first flexible material 611, and the space between the flexible materials 611 and 613 forms the second compartment 634, which has a side profile with an overall shape like a rounded tube. The second compartment 634 surrounds and encloses a second composition 644, which differs from the first composition 643.

Figure 7A:
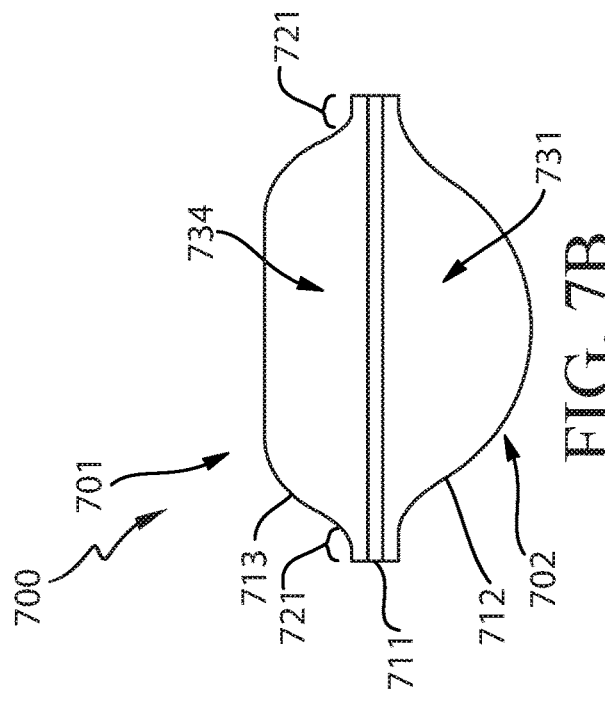
FIG. 7A illustrates a top view of a unit dose article having a rounded top, a rounded bottom, and two smaller side-by-side compartments overlapping a larger bottom compartment.
Figure 7B:
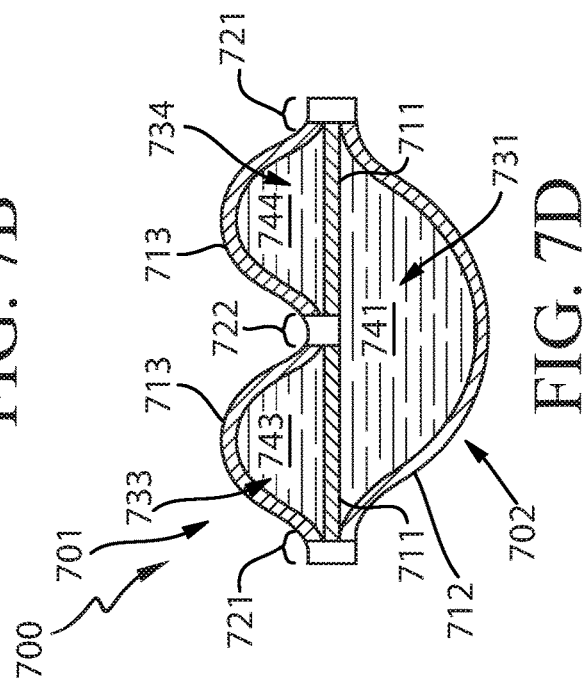
FIG. 7B illustrates a side view of the unit dose article of FIG. 7A.
Figure 7C:
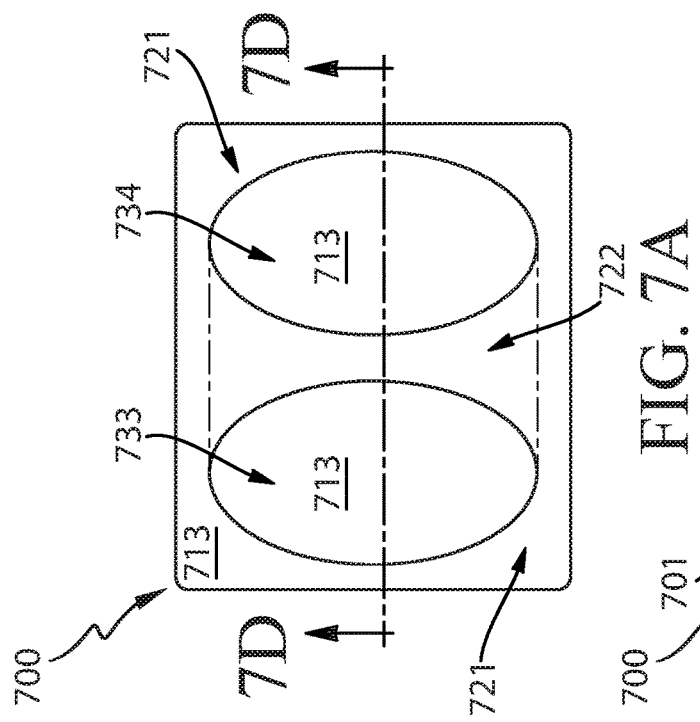
FIG. 7C illustrates an end view of the unit dose article of FIG. 7A.
Figure 7D:
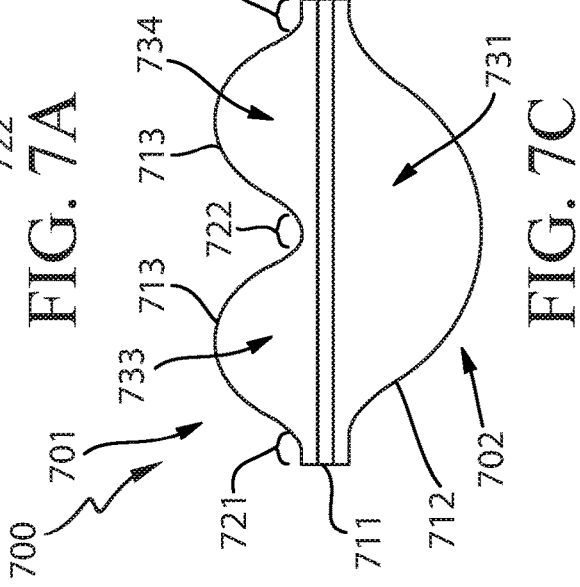
FIG. 7D illustrates a cross-sectional end view of the unit dose article of FIG. 7A.

FIGS. 7A-7D illustrate various views of an exemplary soluble unit dose article 700 having a rounded top 701, a rounded bottom 702, and two smaller side-by-side compartments 733 and 734 each overlapping a larger bottom compartment 731. FIG. 7A is a top view, FIG. 7B is a side view, FIG. 7C is an end view, and FIG. 7D is a cross-sectional end view. In the top view, the overall shape of the article 700 is rectangular with rounded corners. The article 700 is formed by a first flexible material 711, a second flexible material 712, and a third flexible material 713, which are sealed together over a first sealed area 721 and a second sealed area 722, as described below. The first sealed area 721 forms a continuous connection between the flexible materials 711, 712, and 713, all around the outer periphery of the article 700. The second sealed area 722 forms a continuous connection between the first flexible material 711 and the third flexible material 713, through a portion of the middle of the article 700, between the compartments 733 and 734 (as shown, bounded by the reference lines). Apart from the sealed areas 721 and 722, the flexible materials 711, 712, and 713 are independent from each other. The first flexible material 711 is disposed between the second flexible material 712 and the third flexible material 713, and is oriented about horizontally. On the bottom 702, in the middle of the article 700, the second flexible material 712 curves downward from the sealed area 721 such that the second flexible material 712 is offset from the first flexible material 711, and the space between the flexible materials 711 and 712 forms the larger compartment 731, which has a side profile with an overall shape like an inverted bell. The compartment 731 surrounds and encloses a first composition 741. On the top 701, in a first part of the middle of the article 700, a first portion of the third flexible material 713 curves upward from the sealed areas 721 and 722 such that that first portion of the second flexible material 713 is offset from the first flexible material 711, and the space between the flexible materials 711 and 713 forms the first smaller compartment 733, which has a side profile with an overall shape like a rounded tube. The compartment 733 surrounds and encloses a second composition 743, which differs from the first composition 741. On the top 701, in a second part of the middle of the article 700, a second portion of the second flexible material 713 curves upward from the sealed areas 721 and 722 such that that second portion of the second flexible material 713 is offset from the first flexible material 711, and the space between the flexible materials 711 and 713 forms the second smaller compartment 734, which has a side profile with an overall shape like a rounded tube. The compartment 734 surrounds and encloses a third composition 744, which differs from both the first composition 741 and the second composition 743.

Part, parts, or all of any of the soluble unit dose article embodiments of FIGS. 3A-7D can be made, used, and/or modified in any way known in the art. For example, any of these articles can be configured with any convenient size and shape along with any number of compartments, as described herein and/or as known in the art; as examples, a soluble unit dose article can be configured according to any embodiment disclosed in U.S. Pat. No. 9,725,685 entitled "Unit Dose Article," which is hereby incorporated by reference, or any commercially available embodiment of a soluble unit dose article (e.g. TIDE PODS and CASCADE ACTION PACS made by The Procter & Gamble Company, of Cincinnati, Ohio, United States of America). Any of the compartments for these articles can be configured with any convenient size, shape, configuration, and relationship, as described herein and/or as known in the art. Any of the compartments for these articles can be filled with one or more of any composition(s) described herein and/or known in the art of soluble unit dose articles; as examples, such compositions can include on or more of any of the following: fabric care compositions (detergents, surfactants, bleaches, fabric softeners, dyes, brighteners, perfumes, etc.), dish care compositions, agrochemicals, water treatment chemicals, dyes, etc. Any of the compositions disclosed herein can take any convenient form disclosed herein or known in the art, such as: liquid, paste, solid, fibrous, granular, powdered, etc. Any of the flexible materials used to form these articles can be the same material, or different versions of the same material, or different materials, as described herein and/or as known in the art; for example, any of the water soluble films disclosed herein can be used (by itself and/or as part of a laminate/composite material) for part, parts, or all of any of these flexible materials. And, any of the water soluble films disclosed herein can be used (by itself and/or as part of a laminate/composite material) to form part, parts, or all of a soluble unit dose article known in the art, and can include any additives and/or coatings (e.g. bitterants, gas-barrier additives, etc), known in the art of soluble unit dose articles. Part, parts, or all of any of these aspects can be combined together in any workable manner to form further alternative embodiments. Further, any of the water soluble films disclosed herein can be used (by itself and/or as part of a laminate/composite material) to form part, parts, or all of components in health and hygiene products, such as disposable diapers and training pants, incontinence articles, and feminine care products (e.g., pads and liners), in medical products such as bags for bodily fluids and/or waste (e.g., ostomy pouches), and in other household products such as trash bags, laundry bags, hamper liners, etc. Water-soluble films also can be used to form embroidery products, beauty products (e.g. face masks that include water soluble components), personal care products, shaving products, health care products, pharmaceuticals, etc. Still further, any of the water soluble films disclosed herein can be used (by itself and/or as part of a laminate/composite material) to form part, parts, or all of a flexible package (e.g. sachet), in order to provide for improved disposability for the package; such packages can have any convenient size and may include any number of doses (e.g. single dose, multiple dose, etc.). Any of the films described herein can be used as part, parts, or all of a primary package, and/or a secondary package, and/or any other kind of package or packaging material known in the art.

Test Methods

Crystallite Size Test Method

The Crystallite Size Test Method determines the size (in angstroms) of crystals in a polymeric vinyl alcohol film (such as a film made of a copolymer of vinyl alcohol and butene-diol) based on X-ray diffraction and is performed according to the following. The average crystallite size is determined by the following equation:

$$\text{Crystallite Size} = \frac{K * \lambda}{FWHM(S) * \cos\theta}$$

wherein: K is a shape factor for the average crystallite (set at 0.9), $\lambda$ is the wavelength (in Angstroms) of the X-ray radiation applied to the film (i.e. 1.54 Angstroms), FWHM (S) is the (deconvoluted) true sample broadening value (in radians) for the full width half maximum (FWHM) of the peak of interest in the X-ray diffraction pattern, and $\theta$ is the angular value (in radians) of one half of the diffraction angle of that peak. The values for FWHM(S) and $\theta$ are determined by a trained, skilled, and experienced crystallographer using an X-ray diffractometer in transmission mode, as described below.

A transmission test specimen is prepared from the film to be tested. If the film has an overall thickness of less than 0.1 millimeters, then multiple layers of the film are stacked in contact with each other to create a test specimen having an overall thickness of at least 0.1 millimeter. The test specimen is shaped to fit a rotating specimen holder and then mounted in the holder, as described below.

The X-ray measurement is performed with an X-ray diffractometer, which must be selected and set up according to the following configuration. The instrument is a Stoe STADI MP wide angle x-ray diffractometer, available from STOE & Cie. Ltd., Darmstadt, Germany. For the testing, the X-ray generator of the instrument is set up with a sealed copper anode long-fine-focus Cu X-ray tube (focal spot size: 0.4×12 mm). The instrument is fitted with an incident-beam curved germanium-crystallite monochromator, standard incident-beam slit system, which is used for the testing. The specimen holder is a rotating specimen holder, set up in transmission mode. The instrument is equipped with a Mythen 1K single module strip Position Sensitive Detector (PSD) mounted on a powered rotatable goniometer having a rotational axis that intersects the x-ray pathway at a right angle as it passes through the test specimen (when mounted in the specimen holder). The PSD is centered on the X-ray pathway when the goniometer positions the detector at an angle of zero degrees, and the PSD is stationary (i.e. non-moving) once the goniometer rotates the PSD to a particular angle. The specimen holder is also mounted on a powered rotatable specimen holder having a rotational axis that coincides with the rotational axis of the goniometer.

The X-ray diffractometer must be operated at the following conditions. The X-ray tube is powered at 40 kV and 40 mA, and the X-rays are passed through the monochromator creating X-rays having a ($K\alpha_1$) wavelength ($\lambda$) of 1.54 Angstroms and then are passed through the test specimen. The specimen is continuously spun in its holder at a constant angular velocity (at about 35 revolutions per minute), but is spun in a stationary plane, with respect to the X-ray pathway. While operating, the instrument collects and records wide angle X-ray diffraction data while the PSD is held at a number of angular positions (with respect to the X-ray pathway), starting at an angle of 2° and then repositioning the PSD (by rotating the goniometer) to additional larger angles, in increments of 3° (i.e. 2°, 5°, 8°, 11°, etc.), up to and including 74° (2θ), with data collected for 15 seconds at each angle. For each angle of the PSD, the test specimen is positioned (by rotating the specimen holder) to a specimen angle that is equal to half of the PSD angle (i.e. if the goniometer is at 2° then the specimen holder is at 1°, if the goniometer is at 5° then the specimen holder is at 2.5°, etc.; the goniometer to the specimen holder has a 2θ to θ relationship), wherein the PSD and the test specimen rotate in the same direction and in the same plane of rotation.

The diffractometer provides the resulting X-ray diffraction data to digital software that is suitable for computational adjustment and analysis, as set forth below. An example of suitable digital diffraction software is: Jade 2010 available from Materials Data, Inc. of Livermore, Calif., United States of America. In the software, the X-ray diffraction data is presented as a diffraction pattern on a digital diffractogram, as described below. The digital diffractogram has a horizontal axis that is linearly scaled by degrees from 2° to 74° (2θ) and a vertical axis that is linearly scaled for intensity (in counts per second). The diffraction pattern is provided on the diffractogram, with the pattern having a largest peak found in the range of 5-35° (2θ), which is the peak of interest, as described below. The crystallographer selects the peak of interest with a linear background window, and then uses the Pearson VII function in the software to automatically apply baseline correction, fit a profile to the peak, and calculate: a (convoluted) value for the FWHM(I+S) (converted to radians) and a value for 2θ (which can be used to obtain θ, in radians).

The convoluted value for the FWHM is deconvoluted by the following equation:

$$FWHM(S)^D = FWHM(I+S)^D - FWHM(I)^D$$

wherein: FWHM(S) is the (deconvoluted) true sample broadening value (in radians), which results from the deconvolution equation and is used to calculate Crystallite Size; FWHM(I+S) is the convoluted (i.e. raw and unadjusted) value (in radians) initially obtained from the software (as described above); FWHM(I) is the instrument broadening parameter (in radians), which is determined based on the diffraction pattern of a standard reference material, which is lanthanum hexaboride obtained from the National Institute of Standards and Technology, (Gaithersburg, Md., United States of America) as NIST SRM 660A. D is a deconvolution parameter, which is a known function of the optics of the instrument, and is set at 2. For materials other than polymeric vinyl alcohols, the Crystallite Size Test Method does not apply.

Dissolution Test Method

The Dissolution Test Method for a water-soluble film measures the total time (in seconds) for complete dissolution of a particular film specimen when the test is performed according to Slide Dissolution Test, which is MONOSOL Test Method 205 (MSTM 205), as set forth in paragraphs 116-131 of US published patent application US20150093526A1, entitled "Water-soluble film having improved dissolution and stress properties, and packets made therefrom," the entire publication is hereby incorporated by reference; the Dissolution Test Method used herein is the same as that set forth in US20150093526A1, except that in the Dissolution Test Method of the present disclosure, instead of maintaining the distilled water at 10° C., the distilled water is maintained at 15° C. While the standard version of the Dissolution Test Method uses distilled water maintained at 15° C., the Dissolution Test Method may be run in modified form with the distilled water maintained at another specified temperature, in order to provide further comparative data at a different temperature. The Dissolution Test Method does not apply to any materials other than water-soluble films having an overall thickness less than or equal to 3 millimeters.

Hydrolysis Test Method

The Hydrolysis Test Method is a method for determining the Degree of Hydrolysis (as a percentage value) of a polymeric vinyl alcohol film (such as a film made from a copolymer of vinyl alcohol and butene-diol). The Degree of Hydrolysis is the mole percentage of vinyl acetate monomer units that are converted to vinyl alcohol monomer units when the polymeric vinyl alcohol is hydrolyzed, and is calculated by the following equation:

$$\text{Degree of Hydrolysis} = \frac{CH\alpha}{CH\alpha + \frac{(CH3)}{3}} * 100\%$$

wherein: CHα is the integrated area under the CHα peak on the proton nuclear magnetic resonance ($^1$H NMR) spectrum, and CH3 is the integrated area under the CH3 peak on that spectrum (both, as described below). The calculated degree of hydrolysis is rounded to the nearest integer percentage value.

In a polymeric vinyl alcohol, there is a CHα (single proton hydrogen) opposite from each vinyl alcohol monomer unit along the backbone of the polymer. So, the presence of CHα can be taken as representing the presence of vinyl alcohol in the polymer. And, in a polymeric vinyl alcohol, there is a CH3 (three proton hydrogen) included in each vinyl acetate monomer unit along the backbone of the polymer. So, the presence of CH3 (value divided by three, to account for the presence of three protons) can be taken as representing the presence of vinyl acetate in the polymer. In the equation presented above, the numerator CHα represents the vinyl alcohol monomer units in the polymeric vinyl alcohol while the denominator represents the sum of: the vinyl alcohol monomer units and the vinyl acetate monomer units, in the polymeric vinyl alcohol. Multiplying by 100% results in a percentage. The values for CHα and CH3 are determined by a trained, skilled, and experienced NMR technologist using $^1$H NMR spectroscopy, as described below.

A 0.1 gram specimen is obtained from the polymeric vinyl alcohol to be tested; the specimen is mixed with 2 grams of deuterium oxide ($D_2O$), which is at least 99.5% pure, in a glass vial that is then capped. The capped vial is heated in an oven at 70° Celsius for at least one hour, until the polymer is completely dissolved. The solution with the dissolved polymer is transferred to a 5 millimeter NMR tube, which is filled with the solution to a 5 centimeter height, then closed and loaded into an $^1$H NMR spectroscopy instrument for analysis. The $^1$H NMR spectroscopy instrument must have an operating frequency of at least 300 MHz and must also have capabilities according to the analysis criteria set forth below. An example of a suitable $^1$H NMR spectroscopy instrument is: a Bruker Model Avance III, 600 MHz (equipped with a 5 mm broadband probe) available from Bruker Corporation, of Billerica, Mass., United States of America. The $^1$H NMR spectroscopy instrument analyzes the filled NMR tube and records the spectrum data using a zg pulse sequence, a calibrated pulse width (e.g. 14.00), a delay of at least five times the relaxation time for the test specimen (e.g. for a relaxation time of one second, a five second delay), at least 16 scans (e.g. 32 scans), and a suitable acquisition time (e.g. 2.7 seconds).

The instrument provides the resulting $^1$H NMR spectrum data to digital spectroscopy software that is suitable for computational adjustment and analysis, as set forth below. An example of suitable digital spectroscopy software is: MNova NMR version 10.0.2 available from Mestrelab Research, SL, Santiago, Spain. In the digital spectroscopy software, the spectrum data is computationally adjusted (by the software) as follows. The spectrum is formed from the spectrum data using line-broadening having an exponential appodization set at 0.3 Hz. The spectrum is subjected to baseline correction using 3rd order Bernstein Polynomials, resulting in a flat baseline that is aligned to the horizontal axis (i.e. zero intensity). And, the spectrum is phase corrected so that the peaks are well-formed (i.e. having appropriate width and symmetry). The resulting spectrum is provided on a digital spectrogram, as described below.

The digital spectrogram has a horizontal axis that is linearly scaled by parts per million (ppm) and a vertical axis that is linearly scaled for (unitless) intensity. The spectrum is provided on the spectrogram, with the spectrum having a number of peaks of interest (i.e. CHα and CH3), as described below. The ranges of the axes are initially selected to identify the peak representing the presence of the deuterium oxide (single peak typically found around 4-6 ppm); once identified, the spectrum is horizontally aligned on the spectrogram such that the center of the peak representing the deuterium oxide is set at 4.7 ppm. After the spectrum is horizontally aligned, the peak representing the presence of CHα (found at 3.8-4.1 ppm) is identified, and the peak representing the presence of CH3 (found at 1.9-2.1 ppm) is identified. After these peaks of interest are identified, the ranges of the axes are adjusted, such that spectrogram includes the entire width for each peak of interest (e.g. a horizontal range that runs from 1-5 ppm) and each peak of interest occupies a reasonably large portion of the vertical range (e.g. on the order of at least 10%). For the peaks representing the presence of CHα and CH3, the software digitally integrates the area under each peak on the spectrum, using the ranges stated above, (down to zero intensity), and reports each integrated area. These integrated areas are used in the equation provided above, to calculate Degree of Hydrolysis, as a percentage value. For materials other than polymeric vinyl alcohols, the Hydrolysis Test Method does not apply.

Oxygen Transmission Rate Test Method

The Oxygen Transmission Rate Test Method for a film is performed according to the following. The specimens are tested according to ASTM F-1927-14, under the following test conditions: temperature of 40° C. (+/−0.5° C.), relative humidity of 80% (+/−3%), wherein the oxygen partial pressure on the test gas side is equal to the oxygen partial pressure on the carrier gas side (both being the ambient pressure). The oxygen transmission rate is measured in (or converted to) units of cm$^3$/(m$^2$·day). For materials outside of the Scope (§ 1.1) of ASTM F-1927-14, the Oxygen Transmission Rate Test Method does not apply.

Water Vapor Transmission Rate Test Method

The Water Vapor Transmission Rate Test Method for is performed according to the following. The specimens are tested according to ASTM F-1249-13, under the following test conditions: temperature of 40° C. (+/−0.56° C.) and relative humidity of 50% (+/−3%). The water vapor transmission rate is measured in (or converted to) units of g/(m$^2$·day). For materials outside of the Scope (§ 1.1) of ASTM F-1249-13, the Water Vapor Transmission Rate Test Method does not apply.

Other Testing Requirements

When testing and/or measuring a material, if the relevant test method does not specify a particular temperature, then the testing and/or measuring is performed on specimens at a temperature of 22° C. (+/−3° C.) (with such specimens preconditioned to that temperature). When testing and/or measuring a material, if the relevant test method does not specify a particular humidity, then the testing and/or measuring is performed on specimens at a relative humidity of 35% (+/−5%) (with such specimens preconditioned to that humidity). All tools and/or instruments for testing and/or measuring must be properly calibrated before the testing and/or measuring. All testing and/or measuring should be conducted by trained, skilled, and experienced technologists. All testing and/or measuring should be conducted according to good laboratory practices, with the goal of obtaining accurate results.

EXAMPLES

A number of films were made from polymeric vinyl alcohols and were tested for various material properties, barrier properties, and water solubility. The tested films included the following. Example 1, was a co-extruded water-soluble film having three identical layers and an overall film thickness of 75 micrometers, and was formed of a first copolymer of vinyl alcohol and butene-diol along with 13% (by weight) of glycerin (plasticizer), according to inventive embodiments of the present disclosure. Example 2, was a co-extruded water-soluble film having three identical layers and an overall film thickness of 75 micrometers, and was formed of a second copolymer of vinyl alcohol and butene-diol along with 5% (by weight) of polyethylene glycol (plasticizer), according to inventive embodiments of the present disclosure. Comparative Example 1, was a solution cast water-soluble film used for TIDE PODS (soluble unit dose articles for automatic clothes-washing machines, made by The Procter & Gamble Company, of Cincinnati, Ohio, United States of America) having a single layer and an overall film thickness of 75 micrometers, and formed of a polyvinyl alcohol copolymer having a plasticizer. Comparative Example 2, was a solution cast water-soluble film used for CASCADE ACTION PACS (soluble unit dose articles for automatic dish-washing machines, made by The Procter & Gamble Company, of Cincinnati, Ohio, United States of America) having a single layer and an overall film thickness of 75 micrometers, and formed of a polyvinyl alcohol copolymer having a plasticizer. Comparative Example 3, was a solution cast water-soluble film, having a single layer and an overall film thickness of 75 micrometers, and formed of a polyvinyl alcohol homopolymer from Sigma-Aldrich P1763 having 15% by weight of glycerin.

For each of the films of Examples 1 and 2, as well as each of the films of Comparative Examples 1, 2, and 3, the crystallite size was measured according to the Crystallite Size Test Method (as defined herein), and the results (in angstroms) were recorded in Table 1, provided below. For each of the films of Examples 1 and 2, as well as each of the films of Comparative Examples 1, 2, and 3, the degree of hydrolysis was measured according to the Hydrolysis Test Method (as defined herein), and the results were recorded in Table 1, provided below. For each of the films of Examples 1 and 2, as well as each of the films of Comparative Examples 1 and 2, the oxygen transmission rate was measured according to the Oxygen Transmission Rate Test Method (as defined herein), and the results were recorded in Table 1, provided below. For each of the films of Examples 1 and 2, as well as each of the films of Comparative Examples 1 and 2, the water vapor transmission rate was measured according to the Water Vapor Transmission Rate Test Method (as defined herein), and the results (in both mixed units and SI units) were recorded in Table 1, provided below. For each of the films of Examples 1 and 2, as well as each of the films of Comparative Examples 1, 2, and 3, the dissolution time was measured according to the Dissolution Test Method (as defined herein), at both 15° C. (as specified) and 23° C. (modified temperature), and the results (in seconds) were recorded in Table 1, provided below. For each of the films of Examples 1 and 2, as well as each of the films of Comparative Examples 1 and 2, the water vapor transmission rate was measured according to the Water Vapor Transmission Rate Test Method (as defined herein), and the results (in both mixed units and SI units) were recorded in Table 1, provided below.

TABLE 1

| | Ex. 1 | Ex. 2 | Comp. Ex. 1 | Comp. Ex. 2 | Comp. Ex. 3 |
|---|---|---|---|---|---|
| chemistry | BVOH | BVOH | PVOH | PVOH | PVOH |
| Crystallite Size (angstroms) | 23 | 15 | 18 | 21 | 37 |
| Degree of Hydrolysis (%) | 99.3 | 85.5 | 84.9 | 99.1 | 99.5 |
| OTR (cm³/(100 in² * day)) | 7.50 | 22.10 | 20.85 | 12.40 | — |
| OTR (cm³/m² * day) | 116.25 | 342.55 | 323.18 | 192.20 | — |
| Solubility @15° C. (seconds) | 144 | 181 | 124 | 71 | (never) |
| Solubility @23° C. (seconds) | 65 | 125 | 80 | 70 | (never) |
| WVTR (g/(100 in² · day)) | 6.09 | 13.10 | 15.03 | 14.10 | — |
| WVTR (g/m² * day) | 94.40 | 203.05 | 232.89 | 218.55 | — |

Regarding the results listed in Table 1, the following observations are made. For crystallite size, the film of Example 2 was measured as having the smallest crystallite size. For oxygen transmission, the film of Example 1 was measured as having the lowest value, and thus, the best barrier to oxygen. For solubility, Example 1 was measured as having the fastest dissolution time at the temperature of 23° C. For water vapor transmission, the film of Example 1 was measured as having the lowest value, and the film of Example 2 was measured as having the second lowest value, thus the inventive examples were the best barriers to water vapor. Thus, taken as a whole, the data appear to show that water-soluble films made from copolymers of butene-diol and vinyl alcohol, can have improved barrier properties as well as good solubility.

Definitions

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, when the term "approximately" modifies a particular value, the term refers to a range equal to the particular value, plus or minus fifteen percent (+/−15%). For any of the embodiments disclosed herein, any disclosure of a particular value, can, in various alternate embodiments, also be understood as a disclosure of a range equal to approximately that particular value (i.e. +/−15%).

As used herein, the term "copolymer" means a polymer formed from two, or more, types of monomeric repeating units. The term "copolymer" as used herein further encompasses terpolymers, such as terpolymers having a distribution of vinyl alcohol monomer units, vinyl acetate monomer units, and butene diol monomer units; however, if the copolymer is substantially fully hydrolyzed, substantially no vinyl acetate monomeric units may be present.

As used herein, the term "crystallite size" refers to the size of crystals in a polymeric vinyl alcohol film (such as a film made from a copolymer of vinyl alcohol and butene-diol), as determined according to the Crystallite Size Test Method.

As used herein, the term "degree of hydrolysis" refers to the mole percentage of vinyl acetate units that are converted to vinyl alcohol units when a polymeric vinyl alcohol (such as a copolymer of vinyl alcohol and butene-diol) is hydrolyzed, as measured and calculated according to the Hydrolysis Test Method.

As used herein, the term "dissolution time" refers to the time required for a water-soluble film (such as a film made of a polymeric vinyl alcohol) to be dissolved, when measured according to the Dissolution Test Method set forth in the Test Methods section.

As used herein, when the term "nearly" modifies a particular value, the term refers to a range equal to the particular value, plus or minus five percent (+/−5%). For any of the embodiments disclosed herein, any disclosure of a particular value, can, in various alternate embodiments, also be understood as a disclosure of a range equal to approximately that particular value (i.e. +/−5%).

As used herein, the term "oxygen transmission rate" or "OTR" refers to the rate at which oxygen is transmitted through a film, when measured according to the Oxygen Transmission Rate Test Method set forth in the Test Methods section.

As used herein, when the term "substantially" modifies a particular value, the term refers to a range equal to the particular value, plus or minus ten percent (+/−10%). For any of the embodiments disclosed herein, any disclosure of a particular value, can, in various alternate embodiments, also be understood as a disclosure of a range equal to approximately that particular value (i.e. +/−10%).

As used herein, the term "water vapor transmission rate" or "WVTR" refers to the rate at which water vapor is transmitted through a film, when measured according to the Water Vapor Transmission Test Method set forth in the Test Methods section.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments and examples of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water soluble unit dose article comprising:
   a first compartment;
   a second compartment, wherein the first compartment and the second compartment overlap; and
   a film comprising one or more extruded layers comprising a polymeric material comprising a copolymer of vinyl alcohol and butene-diol;
      wherein the film has a crystallite size of about 10 Angstroms to about 35 Angstroms, when measured according to the Crystallite Size Test Method;
      wherein the copolymer has a degree of hydrolysis of about 85% to about 100%, when measured according to the Hydrolysis Test Method;
      wherein the film comprises about 8% to about 30%, by weight of the film, of a plasticizer;
      wherein the film forms at least a portion of the first compartment and/or the second compartment;
      wherein the first compartment surrounds and encloses a first composition;
      wherein the second compartment surrounds and encloses a second composition; and
      wherein the first composition is different than the second composition.

2. The article of claim 1, wherein the film has a crystallite size of about 10 Angstroms to about 30 Angstroms, when measured according to the Crystallite Size Test Method.

3. The article of claim 1, wherein the film has a crystallite size of about 10 Angstroms to about 25 Angstroms, when measured according to the Crystallite Size Test Method.

4. The article of claim 1, wherein the film has a crystallite size of about 15 Angstroms to about 25 Angstroms, when measured according to the Crystallite Size Test Method.

5. The article of claim 1, wherein the copolymer has a degree of hydrolysis of about 90% to about 100%, when measured according to the Hydrolysis Test Method.

6. The article of claim 1, wherein the copolymer has a degree of hydrolysis of about 95% to about 100%, when measured according to the Hydrolysis Test Method.

7. The article of claim 1, wherein the copolymer has a degree of hydrolysis of about 98% to about 100%, when measured according to the Hydrolysis Test Method.

8. The article of claim 1, wherein the copolymer has a degree of hydrolysis of about 99% to about 100%, when measured according to the Hydrolysis Test Method.

9. The article of claim 1, wherein the copolymer is a terpolymer comprising:
   vinyl alcohol monomer units;
   vinyl acetate monomer units; and
   butene diol monomer units.

10. The article of claim 1, wherein the film comprises about 8% to about 25%, by weight of the film, of a plasticizer.

11. The article of claim 1, wherein the film comprises about 8% to about 20%, by weight of the film, of a plasticizer.

12. The article of claim 1, wherein the film comprises about 10 to about 15%, by weight of the film, of a plasticizer.

13. The article of claim 1, wherein the film comprises about 3.5% to about 7.5%, by weight of the film, water.

14. The article of claim 1, wherein the copolymer has a weight average molecular weight of about 50,000 to about 95,000.

15. The article of claim 1, wherein the copolymer has a weight average molecular weight of about 65,000 to about 95,000.

16. The article of claim 1, wherein the film has an overall thickness of about 25 micrometers to about 200 micrometers.

17. The article of claim 1, wherein the film has an overall thickness of about 35 micrometers to about 150 micrometers.

18. The article of claim 1, wherein the film has an overall thickness of about 50 micrometers to about 100 micrometers.

19. The article of claim 1, wherein the first composition is a solid, and wherein the second composition is a liquid.

20. A water soluble unit dose article comprising:
   a first compartment;
   a second compartment, wherein the first compartment and the second compartment overlap;
   a third compartment, wherein the first compartment and the third compartment overlap; and
   a film comprising one or more extruded layers comprising a polymeric material comprising a copolymer of vinyl alcohol and butene-diol;
      wherein the copolymer has a degree of hydrolysis of about 85% to about 100%, when measured according to the Hydrolysis Test Method;
      wherein the film comprises about 8% to about 30%, by weight of the film, of a plasticizer;
      wherein the film forms at least a portion of the first compartment, the second compartment, and/or the third compartment;
      wherein the first compartment surrounds and encloses a first composition;
      wherein the second compartment surrounds and encloses a second composition;
      wherein the third compartment surrounds and encloses a third composition; and wherein the first composition is different than the second and third compositions.

\* \* \* \* \*